(12) United States Patent
Simpson

(10) Patent No.: US 11,364,472 B1
(45) Date of Patent: Jun. 21, 2022

(54) CNT-BASED REVERSE OSMOSIS DESALINATION

(71) Applicant: Waymo LLC, Mountain View, CA (US)

(72) Inventor: John Simpson, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 218 days.

(21) Appl. No.: 16/881,220

(22) Filed: May 22, 2020

(51) Int. Cl.
| | | |
|---|---|---|
| *B01D 71/02* | (2006.01) | |
| *C02F 1/44* | (2006.01) | |
| *B01D 67/00* | (2006.01) | |
| *C01B 32/168* | (2017.01) | |
| *B82Y 30/00* | (2011.01) | |
| *C02F 103/08* | (2006.01) | |
| *B82Y 40/00* | (2011.01) | |

(52) U.S. Cl.
CPC ....... *B01D 71/021* (2013.01); *B01D 67/0039* (2013.01); *B01D 67/0079* (2013.01); *B01D 67/0081* (2013.01); *C01B 32/168* (2017.08); *C02F 1/441* (2013.01); *B01D 2323/04* (2013.01); *B01D 2325/02* (2013.01); *B82Y 30/00* (2013.01); *B82Y 40/00* (2013.01); *C01B 2202/36* (2013.01); *C02F 2103/08* (2013.01)

(58) Field of Classification Search
CPC .............. B01D 71/021; B01D 67/0039; B01D 67/0079; B01D 67/0081; B01D 2323/04; B01D 2325/02; C01B 32/168; C01B 2202/36; C02F 1/441; C02F 2103/08; B82Y 30/00; B82Y 40/00
See application file for complete search history.

(56) References Cited

U.S. PATENT DOCUMENTS

| | | | |
|---|---|---|---|
| 9,611,148 B2 | 4/2017 | Jiang et al. | |
| 2003/0135971 A1* | 7/2003 | Liberman | B22F 1/0547 29/419.1 |
| 2015/0141844 A1* | 5/2015 | Viens | C03B 37/026 600/478 |
| 2020/0062597 A1 | 2/2020 | Zhang et al. | |

FOREIGN PATENT DOCUMENTS

CN 103921368 B 6/2016

* cited by examiner

*Primary Examiner* — Krishnan S Menon
(74) *Attorney, Agent, or Firm* — McDonnell Boehnen Hulbert & Berghoff LLP

(57) ABSTRACT

The present disclosure relates to nanochannel plates for use in reverse osmosis systems and methods of their manufacture. An example nanochannel plate includes a first surface and an opposing second surface. The first surface and the second surface are parallel to a major flat of the nanochannel plate. The nanochannel plate also includes a plurality of channels. At least one channel includes a carbon nanotube having a first end opening proximate to the first surface and a second end opening proximate to the second surface. Optionally, a core portion of the carbon nanotube could be configured to transport water from the first surface to the second surface or vice versa. Optionally, the core portion of the carbon nanotube has a core diameter of less than or equal to 0.7 nanometers.

18 Claims, 9 Drawing Sheets

CNT-BASED REVERSE OSMOSIS DESALINATION

BACKGROUND

Almost all of the world's water (>97%) is saltwater and mostly unusable for human consumption. Currently, the most efficient way of converting saltwater to freshwater is with the use of a reverse osmosis (RO) membrane. However, it takes a great deal of energy to convert saltwater to freshwater via reverse osmosis desalination because of large capillary forces that act on the pores of conventional RO membranes.

SUMMARY

The present disclosure relates to the utilization of drawing techniques, such as with a meltable material like glass, to align and disperse carbon nanotubes within the meltable material. Such techniques could provide a low pressure RO membrane for saltwater desalination.

In a first aspect, a nanochannel plate is provided. The nanochannel plate includes a first surface and an opposing second surface. The first surface and the second surface are parallel to a major flat of the nanochannel plate. The nanochannel plate also includes a plurality of channels. At least one channel includes a carbon nanotube having a first end opening proximate to the first surface and a second end opening proximate to the second surface.

In a second aspect, a method is provided. The method includes inserting a plurality of carbon nanotubes into a core portion of a tube preform. The core portion is disposed along a long axis of the tube preform. The method also includes heating at least a portion of the tube preform. The method additionally includes pulling the tube preform along the long axis so as to lengthen and narrow the tube preform and thereby providing a pulled preform. The method yet further includes cutting the pulled preform into portions. The method additionally includes bundling the pulled preform portions.

Other aspects, embodiments, and implementations will become apparent to those of ordinary skill in the art by reading the following detailed description, with reference where appropriate to the accompanying drawings.

DETAILED DESCRIPTION

Figure 1:
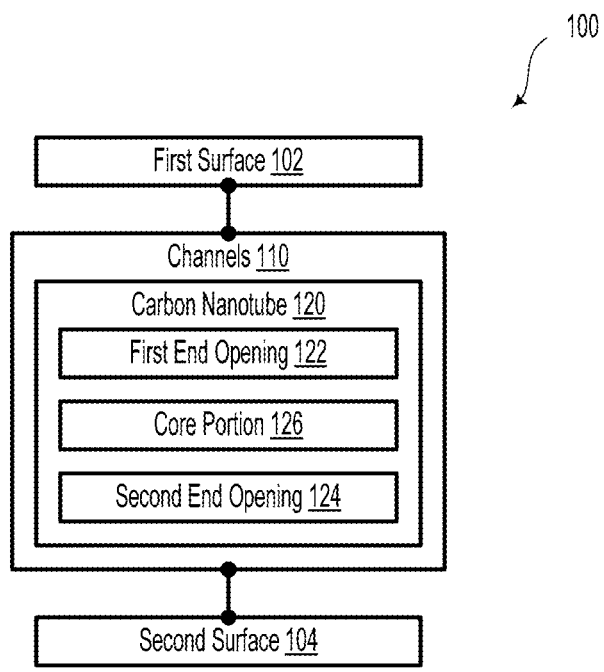
FIG. 1 schematically illustrates a nanochannel plate, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Almost all of the world's water (>97%) is saltwater and mostly unusable for human consumption. Currently, the most efficient way of converting saltwater to freshwater is with the use of a reverse osmosis (RO) membrane. However, it takes a great deal of energy to convert saltwater to freshwater via reverse osmosis desalination because of large capillary forces that act on the pores of conventional RO membranes.

Carbon nanotubes (CNTs) have shown the ability to transport (flow) water through their hollow cores at 6 to 7 orders of magnitude greater than through standard RO membrane pores, enabling low pressure, low energy CNT-based RO membranes. Such a membrane could be realized by aligning and uniformly dispersing the CNTs within a membrane matrix material. However CNTs can be difficult to disperse and/or align with respect to one another. For example, in some scenarios, CNTs stick together via Van der waal forces and tend to agglomerate, looking like balls of spaghetti. The easiest and cheapest way of making CNTs results in CNTs that look like spaghetti type clusters. Accordingly, a method to align and disperse CNTs within a matrix material is desired.

The present disclosure utilizes drawing techniques, such as with a meltable material (e.g., glass), to align and disperse CNTs within the meltable material. Such techniques could provide a low pressure RO membrane for saltwater desalination. As described herein, "meltable" or "melting" could include various processes to lower a viscosity of a material by means of heating so that the material can be flexibly pulled and/or stretched (e.g., like taffy). In some embodiments, "melting" of described preforms could include heating preform materials to temperature below the true melting point of the preform material. In other words, various embodiments include reducing the viscosity of the preform material by heating so as to stretch the preform material but not heat it to fully melt the preform material to liquid form.

The present disclosure relates to the mechanical alignment and dispersion of CNTs using fiber drawing techniques similar to how optical fiber is made. Instead of having a glass core and tube to draw, a tube is filled with CNTs, drawn, cut into segments, bundled, redrawn, recut, re bundled, etc. Each draw forces a mechanical alignment of CNTs, while each cut and bundle forces a mechanical dispersion of the CNTs. The final result is an array of CNTs that have the desired alignment and dispersion/arrangement within a glass matrix.

Some embodiments could include forming a "bundle" of glass rods that contain aligned and dispersed CNTs. The method includes cutting the bundle to form a RO membrane with exposed (open ended) CNT cores. Various surfaces of the membrane can be chemically treated (e.g., to repel salt ions). While there are some technical challenges to make sure the CNT cores are open and less than 0.7 nm in size, the potential advantages of making such a reverse osmosis membrane would be revolutionary and could change the world.

II. Example Nanochannel Plates

FIG. 1 schematically illustrates a nanochannel plate 100, according to an example embodiment. The nanochannel plate 100 includes a first surface 102 and an opposing second surface 104. In some embodiments, the first surface 102 and the second surface 104 could be parallel to a major flat of the nanochannel plate 100. As an example, the nanochannel plate 100 could have a flat cylindrical shape. In some embodiments, the nanochannel plate 100 could have a diameter of between 1 and 4 inches (e.g., ~25-~100 millimeters). As an example, the nanochannel plate 100 could have a diameter of 2 inches or ~50 millimeters. The nanochannel plate 100 could have a thickness of between 0.25-5 millimeters. As an example, the nanochannel plate 100 could have a thickness of about 500 microns or 0.5 millimeters. It will be understood that other dimensions of the nanochannel plate 100 (e.g., other values for diameter and thickness) are contemplated and possible.

In some embodiments, at least a portion of the nanochannel plate 100 could be formed from a meltable material, such as glass. The nanochannel plate 100 includes a plurality of channels 110. In some embodiments, each channel could represent an opening or pathway between the first surface 102 and the second surface 104. At least one of the channels 110 includes a carbon nanotube 120 having a first end opening 122 proximate to the first surface 102 and a second end opening 124 proximate to the second surface 104.

In some embodiments, the channels 110 could be completely filled with carbon nanotubes and/or sodium silicate material such that liquid can flow through the carbon nanotubes. In some embodiments, a core portion 126 of the carbon nanotube 120 is configured to transport a liquid, such as water, from the first surface 102 to the second surface 104 or vice versa. In such scenarios, the core portion 126 of the carbon nanotube 120 could have a core diameter of less than or equal to 0.8 nanometers. For example, the core portion 126 of the carbon nanotube 120 could have a core diameter of 0.7 nanometers, 0.5 nanometers, 0.4 nanometers, or less. It will be understood that other core diameters are contemplated and possible.

In some embodiments, the carbon nanotubes 120 could include single-walled and/or multi-walled carbon nanotubes. In such scenarios, the carbon nanotubes 120 could have a length of approximately 0.5 to 10 millimeters. However, other lengths are possible.

Figure 2:
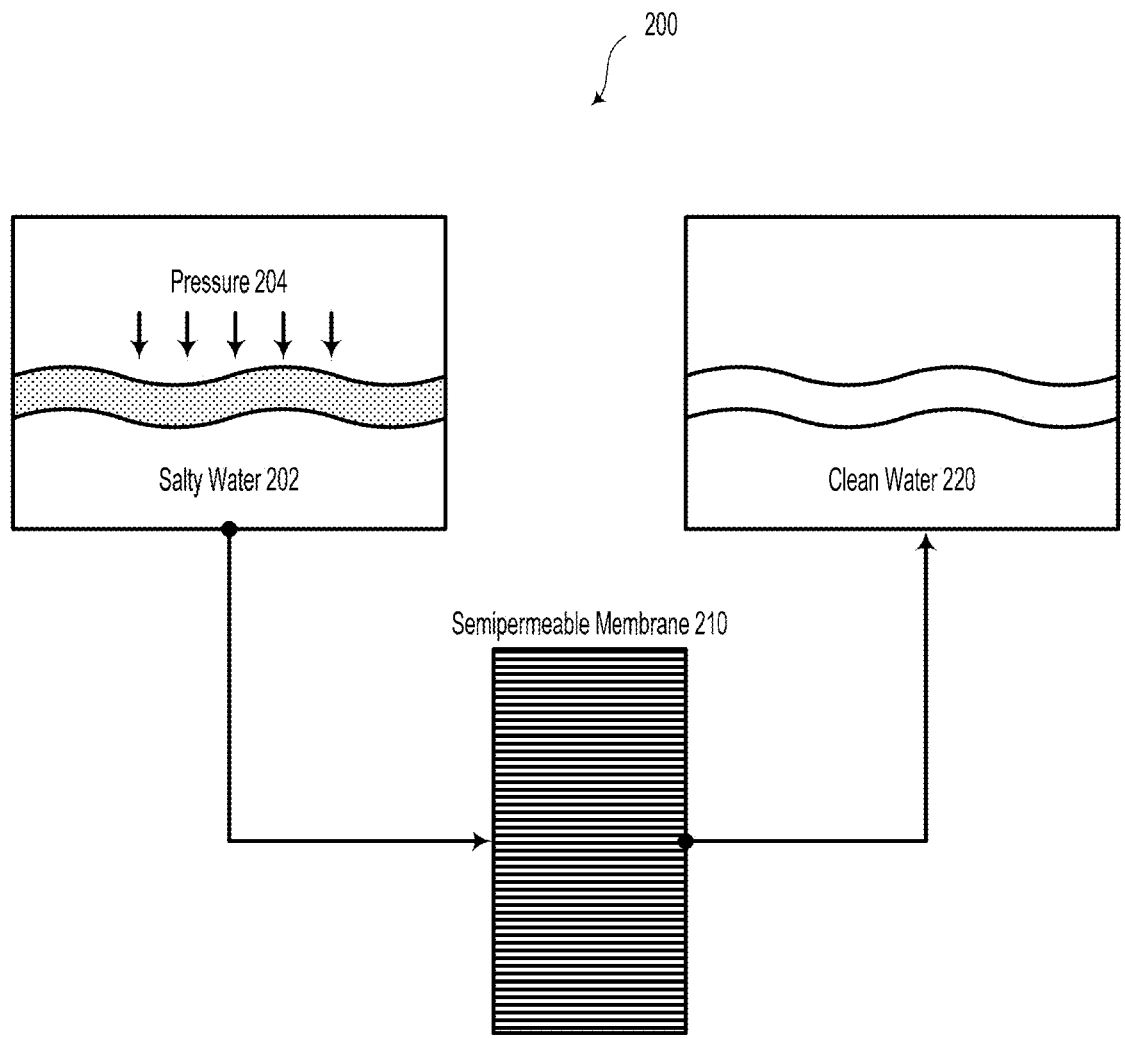
FIG. 2 illustrates a reverse osmosis scenario, according to an example embodiment.

FIG. 2 illustrates a reverse osmosis scenario 200, according to an example embodiment. In some embodiments, salty water 202 could be forced (e.g., by applying pressure 204) through a semipermeable membrane 210 (e.g., nanochannel plate 100), which may filter some or all salt from the water so as to provide clean water 220. In other words, nanochannel plate 100 could form a portion of a reverse osmosis system for providing clean water 220 from salty water 202.

Figure 3A:
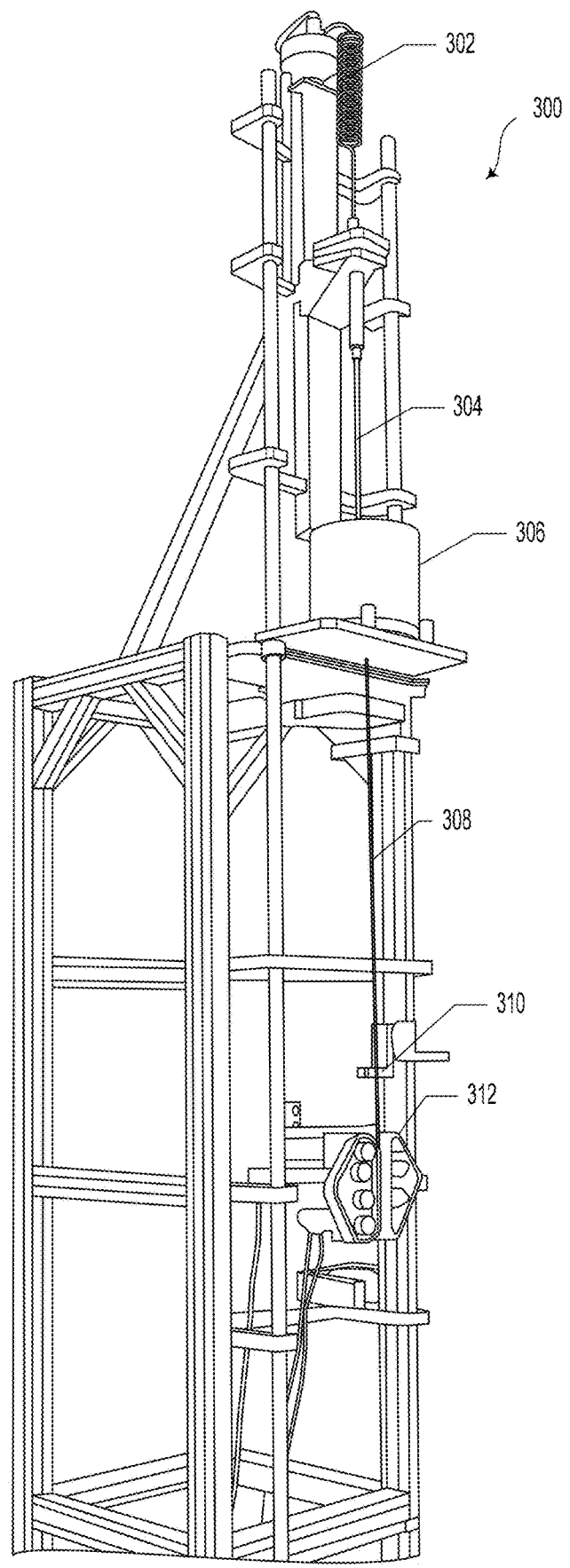
FIG. 3A illustrates a drawing tower, according to an example embodiment.
Figure 3B:
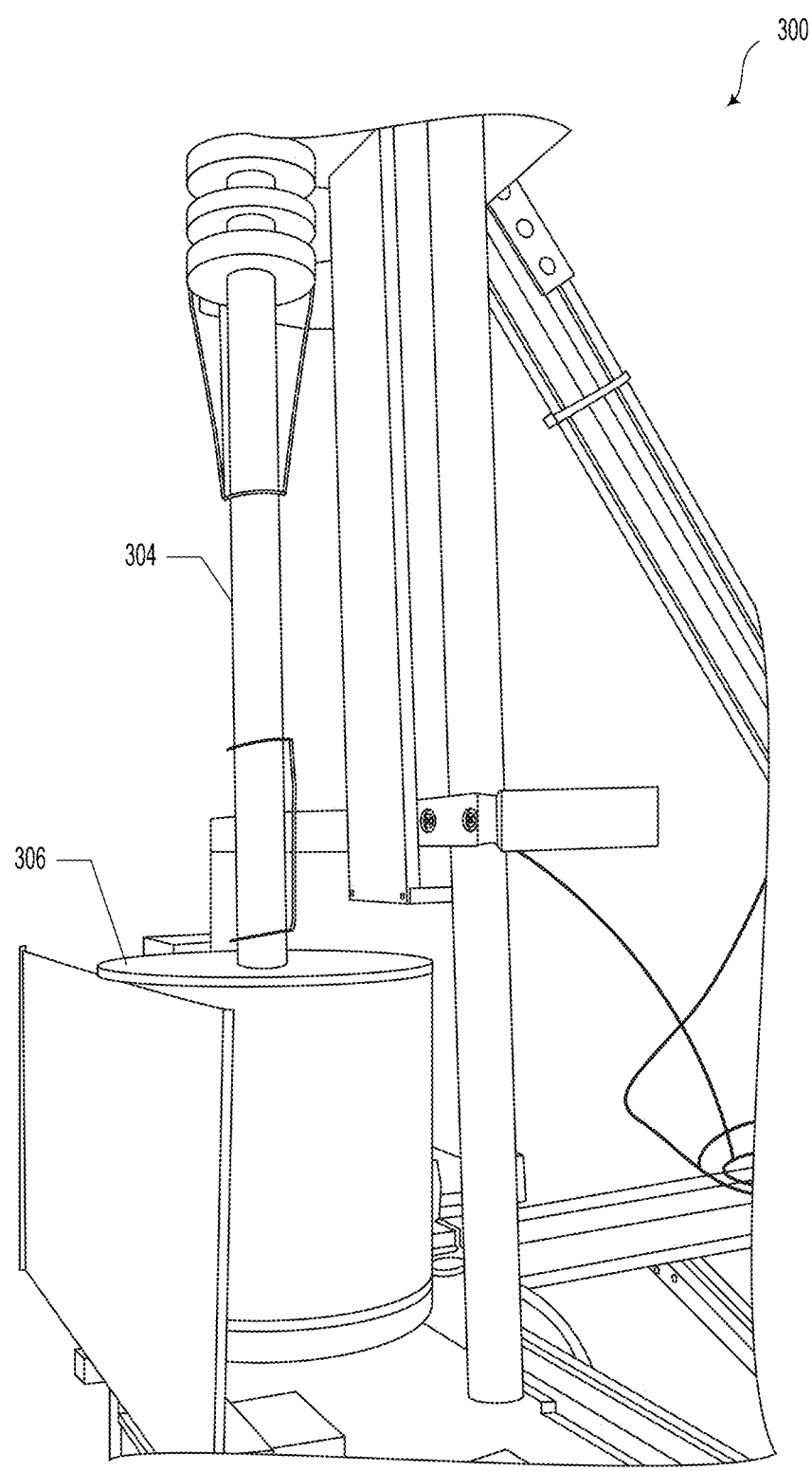
FIG. 3B illustrates a drawing tower, according to an example embodiment.

FIGS. 3A and 3B illustrate various views of a drawing tower 300, according to an example embodiment. In various embodiments, drawing tower 300 could be similar or identical to drawing towers that may be utilized in optical fiber drawing processes. In such scenarios, the drawing tower 300 could be applied to enable a reduction in radial size of the glass tube and axial linearization of contents in the glass tube. As an example, the one-dimension size reduction of the drawing tower 300 could be comparable to or similar to that of the two-dimensional size reduction that can be provided by certain optical lithography techniques.

In some embodiments, the drawing tower 300 could include a preform feed 302. The preform feed 302 could provide a preform 304. As an example, preform 304 could be formed from a glass material (e.g., a glass tube) or another type of meltable or flexible material.

In some embodiments, the drawing tower 300 could also include a heater 306, which could be an oven or another type of thermal chamber. The heater 306 could be configured to heat the preform 304 to a controllable temperature (e.g., 800-1100° C.). In such scenarios, the heater 306 could be configured to melt the preform 304. Melting and pulling the preform 304 may reduce its diameter so as to provide a pulled preform 308.

One or more aspects of the pulled preform 308 could be measured by sensor 310. In some scenarios, sensor 310 could measure the diameter of the pulled preform 308. As an example, the sensor 310 could include a laser micrometer device, a camera, or another type of sensor configured to determine one or more dimensions of the pulled preform 308.

In some embodiments, the pulled preform 308 may be pulled and/or collected by capstan 312. In some embodiments, the capstan 312 could provide a predetermined tension force on the pulled preform 308. By pulling the pulled preform 308, the carbon nanotubes in the preform 304 could be elongated and/or aligned along a long axis of the pulled preform 308.

Additionally or alternatively, the drawing tower 300 could include a cutting device configured to cut the pulled preform 308 at a predetermined position along its length.

As described herein, the drawing tower 300 could be used to melt glass tube preforms. In such scenarios, the glass tube preforms could be drawn by the drawing tower 300 so as to provide an elongated and narrowed glass tube.

Furthermore, the glass tube preforms could be loaded with a carbon nanotube slurry or a carbon nanotube powder. In such scenarios, during a series of drawing and bundling steps, the carbon nanotubes could become aligned and dispersed. In other words, various types of carbon nanotubes could be aligned and dispersed by utilizing a process similar to that of optical fiber drawing. In practice, carbon nanotubes tend to adhere or stick to one another, sometimes forming a spaghetti-like agglomeration of carbon nanotubes. The process of drawing agglomerated carbon nanotubes loaded in a glass tube may help to align and controllably disperse the carbon nanotubes.

Figure 4:
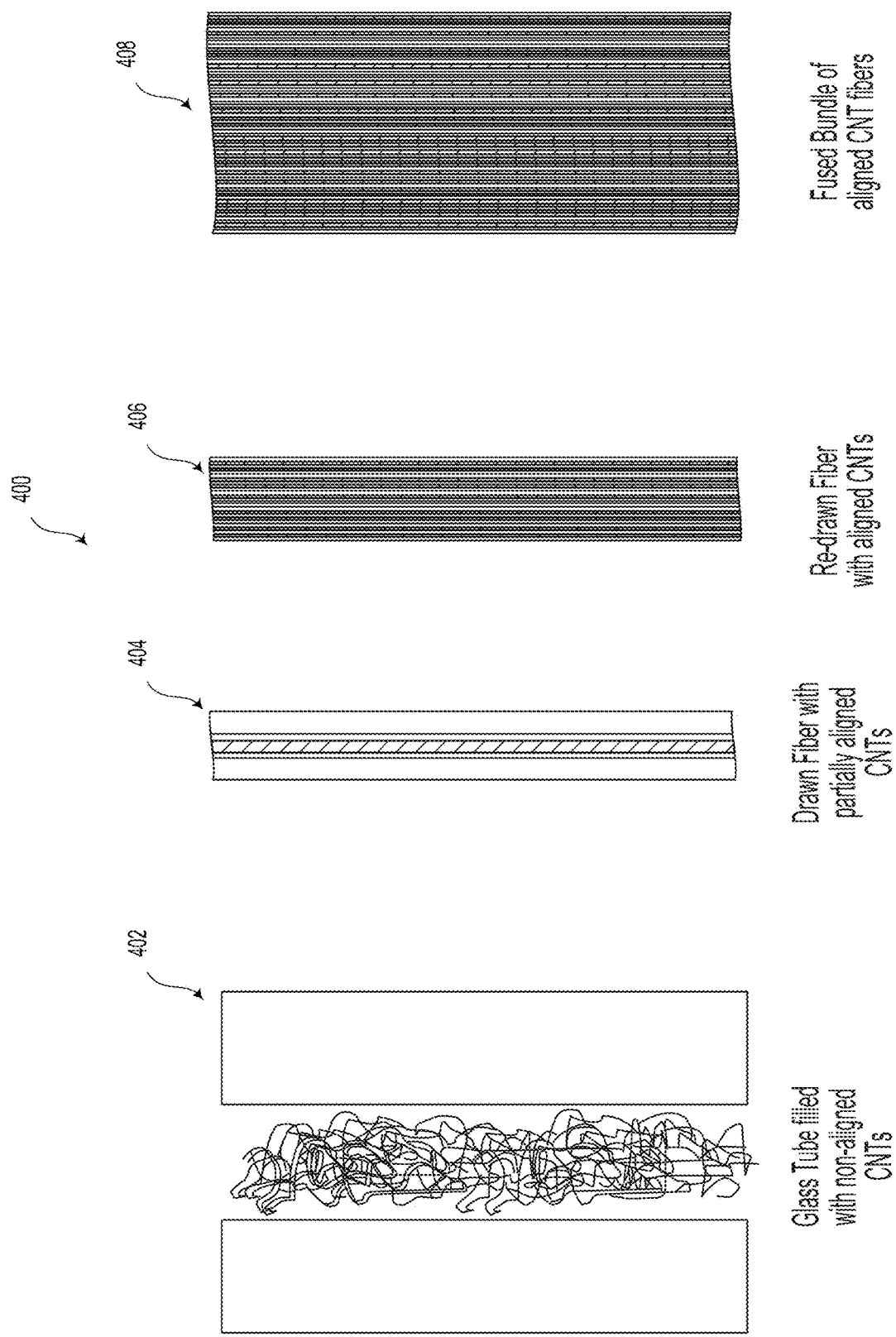
FIG. 4 illustrates several cross-sections of glass tube/carbon nanotube structures, according to example embodiments.

FIG. 4 illustrates several cross-sections 400 of glass tube/carbon nanotube structures, according to example embodiments.

Cross-section 402 illustrates a glass tube (e.g., preform 304) filled with non-aligned carbon nanotubes. Such carbon nanotubes could be randomly oriented and/or randomly distributed within a solid, powder, or liquid slurry form. The preform could have an outer diameter of 2-4 millimeters. Other outer diameters, both larger and smaller, are possible and contemplated. As described herein, the preform could be filled with a carbon nanotube-containing powder. Such a powder could include a sodium silicate material, which may provide a low melting point material to assist in "reflowing" the carbon nanotubes within the preform inner core opening. In some embodiments, cross-section 402 could illustrate an initial preform after carbon nanotube loading, but before heating and pulling. As just one example, the glass tube could have an inner opening diameter between 0.1 and 1.0 millimeters. However, other inner core diameters are possible and contemplated.

Cross-section 404 illustrates a thinned glass pulled preform tube filled with partially-aligned carbon nanotubes. In some embodiments, the pulled preform could be thinned to less than half of the original preform diameter. It will be understood that, under some conditions, the pulled preform could be thinned to less than 0.5 millimeters, less than 0.3 millimeters, or less than 0.1 millimeters.

Cross-section 406 illustrates a small bundle of pulled preform structures (e.g., fibers) with aligned carbon nanotubes after a redrawing process. As an example, such a small bundle of fibers could include 7-20 pulled preform fibers. After the bundling and redrawing process, the small bundle of pulled preform structures could have a diameter similar to, or smaller than, that of the original preform.

Cross-section 408 illustrates a fused large bundle of fibers with aligned carbon nanotubes. In some embodiments, cross-section 408 could illustrate a bundle of fibers with diameter of between 1-4 inches. It will be understood that fiber bundles could have larger or smaller diameters.

Figure 5:
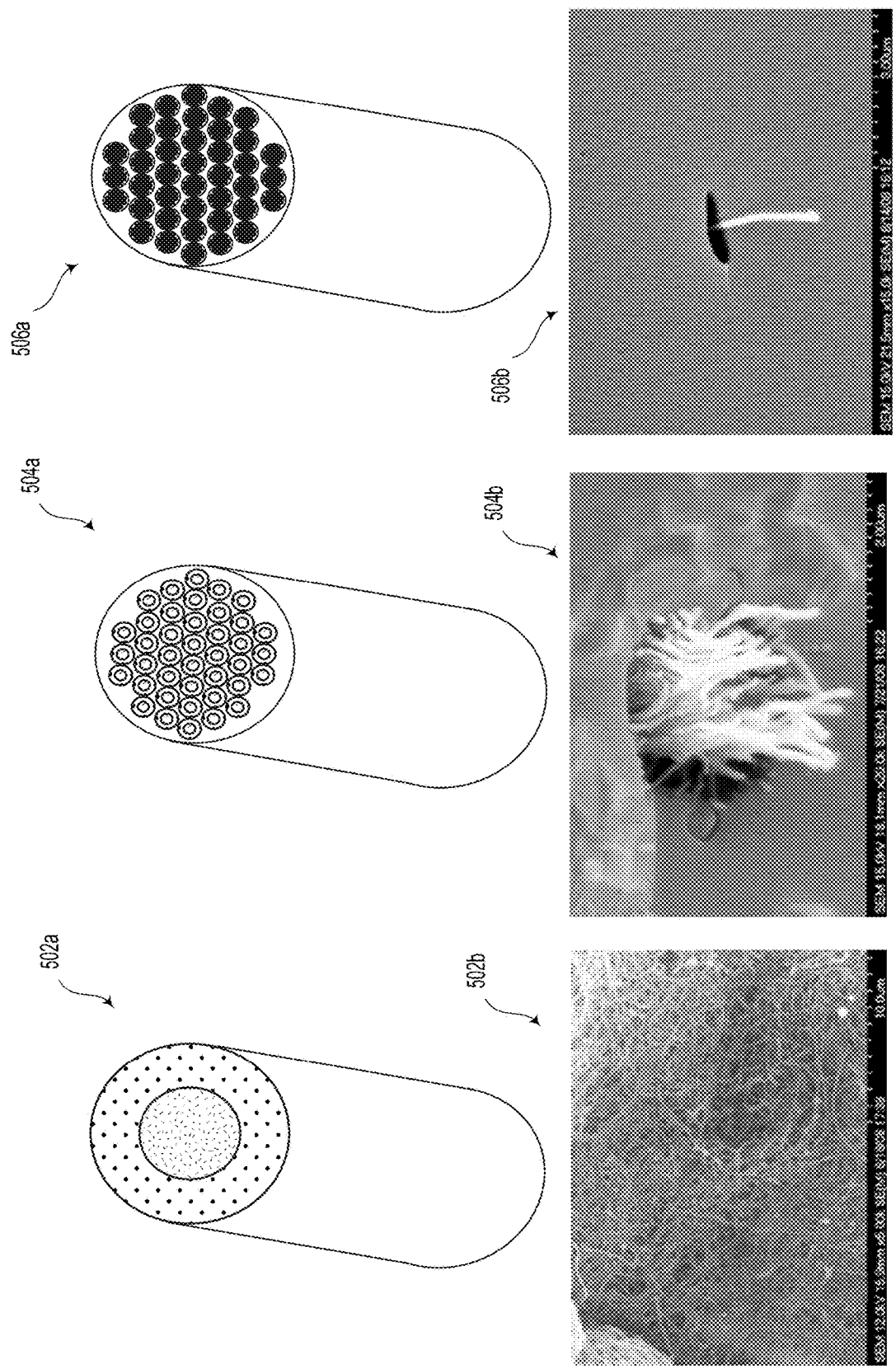
FIG. 5 illustrates several schematic cross-sections and corresponding scanning electron microscope images, according to example embodiments.

FIG. 5 illustrates several schematic cross-sections 502a, 504a, and 506a that correspond to scanning electron microscope images 502b, 504b, and 506b, according to example embodiments. In some embodiments, the scanning electron microscope images could show how the carbon nanotubes are progressively dispersed and aligned along a long axis of the bundled and pulled preforms. That is, in some embodiments, by repeatedly pulling, cutting, and bundling pulled preforms, each volume of carbon nanotubes could be gradually elongated along the long axis. Furthermore, individual carbon nanotubes could be straightened so that at least one nanotube could span the distance between the first surface 102 and second surface 104 of the nanochannel plate 100. Such carbon nanotubes could be configured to transport liquids (e.g., water) from the first surface 102 to the second surface 104, or vice versa.

Figure 6:
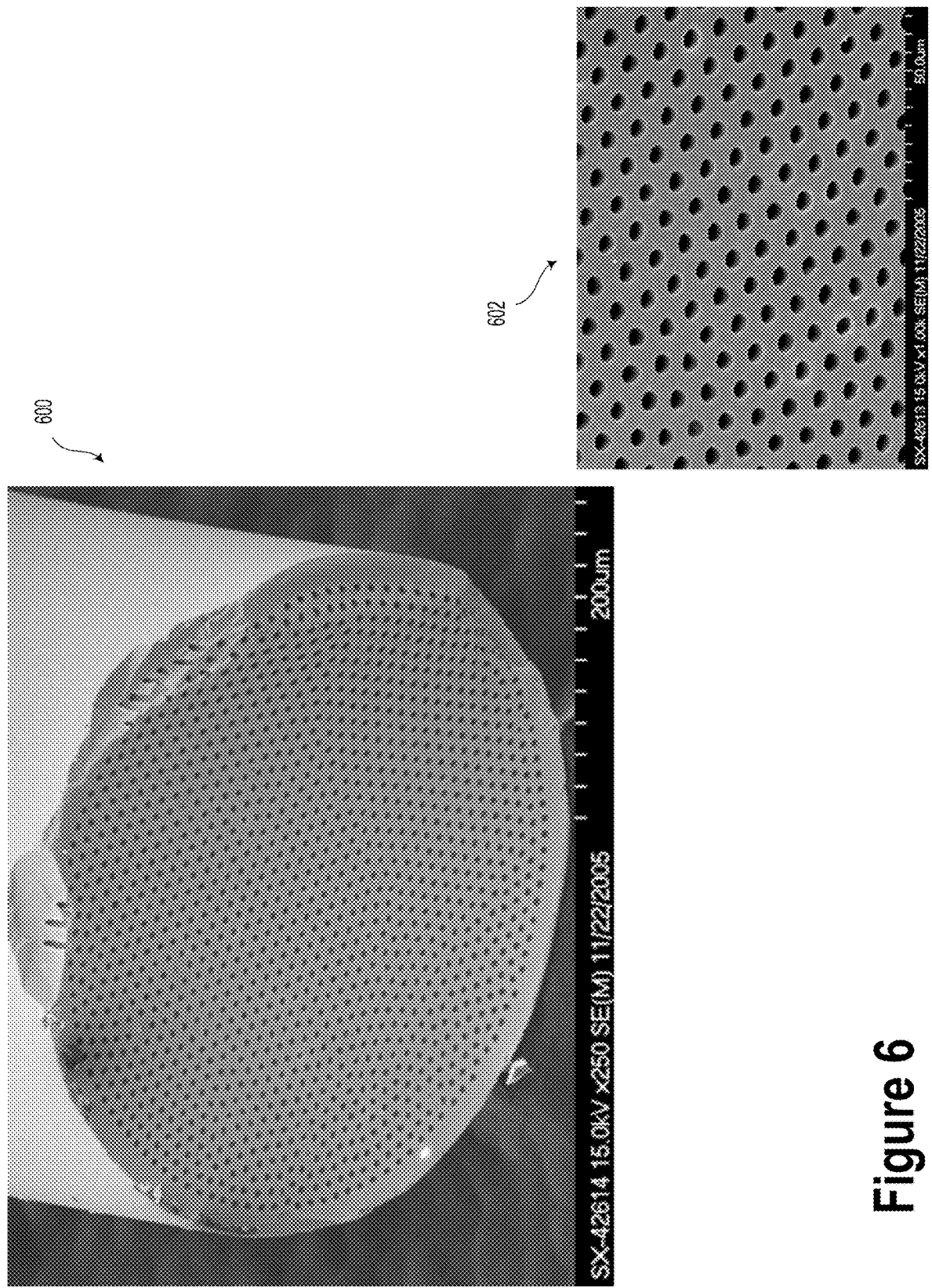
FIG. 6 illustrates scanning electron microscope images of pores in a bundle of drawn glass fibers, according to an example embodiment.

FIG. 6 illustrates scanning electron microscope images 600 and 602 of pores in a bundle of drawn glass fibers, according to an example embodiment. Scanning electron microscope images 600 and 602 illustrate examples of substantially hexagonally-close-packed arrangements of openings in a bundle of pulled preforms. In some embodiments, a plurality of carbon nanotubes could be filled in each of the pulled preform openings.

III. Example Methods

Figure 7:
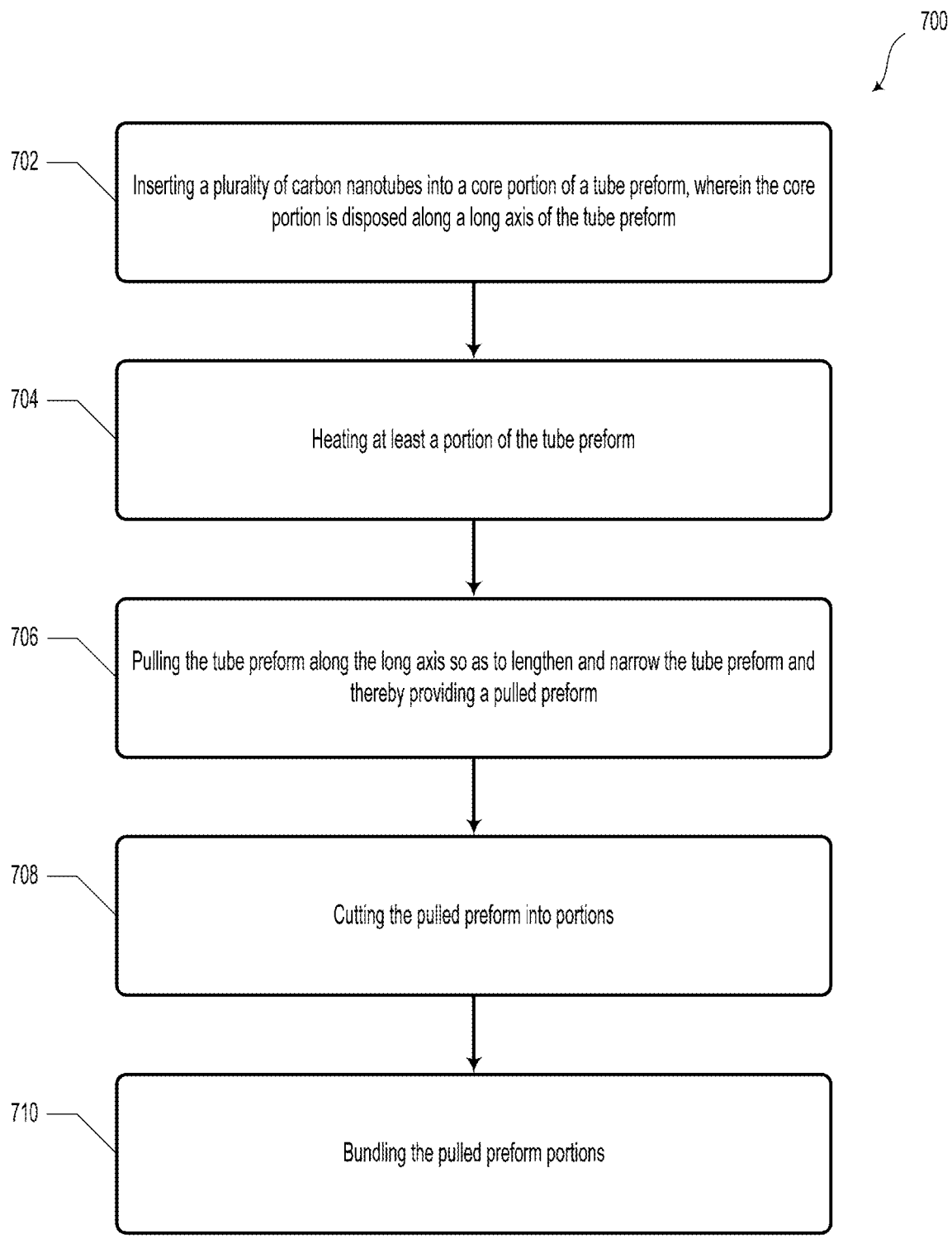
FIG. 7 illustrates a method, according to an example embodiment.
Figure 8:
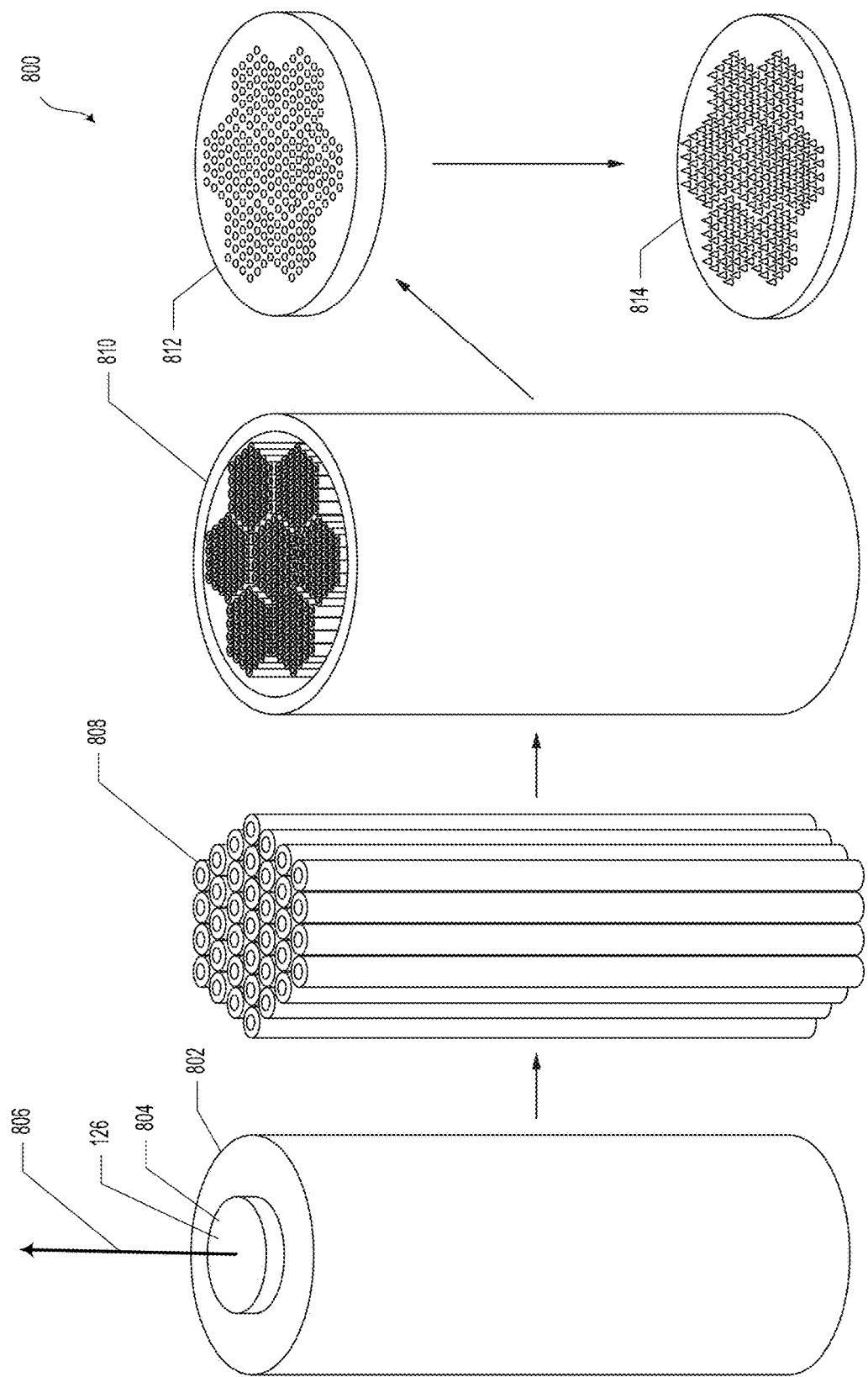
FIG. 8 illustrates a method, according to an example embodiment.

FIGS. 7 and 8 illustrate steps or blocks of a method 700, according to an example embodiment. It will be understood that the method 700 may include fewer or more steps or blocks than those expressly illustrated or otherwise disclosed herein. Furthermore, respective steps or blocks of method 700 may be performed in any order and each step or block may be performed one or more times. In some embodiments, some or all of the blocks or steps of method 700 may relate to elements of nanochannel plate 100 as illustrated and described in relation to FIG. 1. Additionally or alternatively, some or all of the block or steps of method 700 may utilize a drawing tower, such as the drawing tower 300 described and illustrated in reference to FIGS. 3A and 3B.

As described herein, method 700 could relate to various operations to manufacture the nanochannel plate 100 as illustrated and described in relation to FIG. 1. The various blocks of method 700 will now be described in reference to certain elements of FIG. 8.

Block 702 includes inserting a plurality of carbon nanotubes (e.g., carbon nanotube(s) 120) into a core portion (e.g., core portion 126) of a tube preform 802. In some embodiments, the tube preform 802 could be at least partially filled with a carbon nanotube-containing slurry or powder.

In some embodiments, the tube preform 802 could be a glass material. In such scenarios, the glass material could include at least one of: a borosilicate glass, soda lime glass, or quartz glass. In other examples, the tube preform 802 could include a polymer (e.g., a thermoplastic material). Additionally or alternatively, the tube preform 802 could include a meltable metal material.

In various embodiments, the core portion 126 may be disposed along a long axis 806 of the tube preform 802.

Block 704 includes heating at least a portion of the tube preform 802. In some embodiments, the tube preform 802 could be heated by heater 306 of the drawing tower 300 as illustrated and described in reference to FIG. 3. As an example, the tube preform 802 could be heated by heater 306 so as to melt the tube preform 802.

Heating the tube preform 802 lowers the glass viscosity and the contents within the inside of the glass tube may liquefy and flow as the preform is pulled. In such a scenario, the carbon nanotubes can be aligned along the long axis of the tube preform 802.

Block 706 includes pulling the tube preform 802 along the long axis 806 so as to lengthen and narrow the tube preform 802 and thereby providing a pulled preform (e.g., pulled preform 308). As described herein, pulling the tube preform could be carried out using a drawing tower system (e.g., drawing tower 300).

Block 708 includes cutting the pulled preform into portions. In some embodiments, cutting the pulled preform into portions could be performed by a laser cutting tool. Additionally or alternatively, cutting the pulled preform could be performed by a different type of cutting device, such as a shear or another type of cutting tool.

In some embodiments, cutting the pulled preform into portions could include cutting the pulled preform into portions having substantially equal lengths. As an example, the pulled preform could be cut into lengths of about 1 meter. Other pulled preform cut lengths (e.g., 0.5 to 3 meters) are possible and contemplated.

Block 710 includes bundling the pulled preform portions into a bundle 808 of pulled preforms. Bundling the pulled preform portions could include arranging them in a hexagonal close-packed arrangement. Other arrangements are possible and contemplated.

In some embodiments, method 700 could additionally or alternatively include fusing the bundled pulled preform portions to provide a fused bundle 810. In such scenarios, the method 700 could also include cutting the fused bundle along a plane transverse to the long axis to form at least one nanochannel plate (e.g., nanochannel plate 100). In various embodiments, cutting the fused bundle could include utilizing a laser cutting device. However, other types of cutting devices are possible and contemplated.

Method 700 could additionally include applying a coating to at least a portion of the at least one nanochannel plate (e.g., nanochannel plate 812). As an example, such a coating could include a hydrophobic material, such as fluorinated silane. Other coatings (e.g., linked silane materials) are possible and contemplated.

In various embodiments, the nanochannel plates described herein could have a first surface (e.g., first surface 102) and an opposing second surface (e.g., second surface 104). In such scenarios, the first surface and the second surface are parallel to a major flat of the at least one nanochannel plate.

In an example embodiment, the nanochannel plates could include a plurality of channels (e.g., channels 110). In such scenarios, at least one channel could include a carbon nanotube having a first end opening (e.g., first end opening 122) proximate to the first surface and a second end opening (e.g., second end opening 124) proximate to the second surface.

In various embodiments, a core portion (e.g., core portion 126) of the carbon nanotube could be configured to transport water or another liquid from the first surface to the second surface or vice versa.

The core portion of the carbon nanotube could have a core diameter of less than or equal to 0.7 nanometers. Additionally or alternatively, the core diameter could be between 0.4 and 2 nanometers. However, other core diameters are possible and contemplated.

In some embodiments, method 700 could additionally include forming a carbon nanotube solution (e.g., a slurry). Such a carbon nanotube solution could include carbon nanotubes suspended in a liquid. Method 700 could additionally or alternatively include heating the carbon nanotube solution to a temperature such as 400° C.-500° C. so as to evaporate the liquid and to provide a carbon nanotube powder. In such examples, inserting the plurality of carbon nanotubes into the core portion of the tube preform could include inserting the carbon nanotube powder into the core portion of the tube preform (e.g., preform 304). In some examples, the liquid could include water and/or sodium silicate.

In some embodiments, the sodium silicate may provide: i) a low melting point glass and/or ii) a coating for the carbon nanotubes that could prevent their oxidation or overheating.

In various embodiments, method 700 could include repeating at least the heating (e.g., block 704), pulling (e.g., block 706), cutting (e.g., block 708), and bundling (e.g., block 710) steps a predetermined number of times. As an example, the predetermined number of repeats could be between two to ten iterations. Other values for the predetermined number of repeats are possible and contemplated.

In some embodiments, method 700 could include applying a chemical treatment to the carbon nanotubes so as to open one or both ends of the carbon nanotubes along the respective first and second surfaces of the nanochannel plate. Additionally or alternatively, the chemical treatment could functionalize one or more surfaces of the respective carbon nanotubes. As an example, the chemical functionalization could include covalent bonding of functional groups to carbon nanotubes. Such chemical functionalization could be performed at the end caps of nanotubes or along a sidewall of the nanotubes.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
    inserting a plurality of carbon nanotubes into a core portion of a tube preform, wherein the core portion is disposed along a long axis of the tube preform;
    heating at least a portion of the tube preform;
    pulling the tube preform along the long axis so as to lengthen and narrow the tube preform and thereby providing a pulled preform;
    cutting the pulled preform into portions; and
    bundling the pulled preform portions.

2. The method of claim 1, further comprising:
    fusing the bundled pulled preform portions to provide a fused bundle; and
    cutting the fused bundle along a plane transverse to the long axis to form at least one nanochannel plate.

3. The method of claim 2, further comprising:
    applying a coating to at least a portion of the at least one nanochannel plate, wherein the coating comprises a hydrophobic material.

4. The method of claim 3, wherein the hydrophobic material comprises fluorinated silane.

5. The method of claim 2, wherein the at least one nanochannel plate has a first surface and an opposing second surface, wherein the first surface and the second surface are parallel to a major flat of the at least one nanochannel plate.

6. The method of claim 5, wherein the at least one nanochannel plate comprises a plurality of channels, wherein at least one channel comprises a carbon nanotube having a first end opening proximate to the first surface and a second end opening proximate to the second surface.

7. The method of claim 6, wherein a core portion of the carbon nanotube is configured to transport water from the first surface to the second surface or vice versa.

8. The method of claim 6, wherein a core portion of the carbon nanotube has a core diameter of less than or equal to 0.7 nanometers.

9. The method of claim 1, wherein the tube preform comprises a glass material.

10. The method of claim 9, wherein the glass material comprises at least one of: a borosilicate glass, soda lime glass, or quartz glass.

11. The method of claim 1, wherein the tube preform comprises a polymer.

12. The method of claim 1, wherein the tube preform comprises a metal.

13. The method of claim 1, further comprising:
forming a carbon nanotube solution, wherein the carbon nanotube solution comprises carbon nanotubes suspended in a liquid; and
heating the carbon nanotube solution so as to evaporate the liquid and to provide a carbon nanotube powder, wherein inserting the plurality of carbon nanotubes into the core portion of the tube preform comprises inserting the carbon nanotube powder into the core portion of the tube preform.

14. The method of claim 13, wherein the liquid comprises at least one of: water or sodium silicate.

15. The method of claim 1, further comprising:
repeating at least the heating, pulling, cutting, and bundling steps a predetermined number of times.

16. The method of claim 1, wherein cutting the pulled preform into portions is performed by a laser cutting tool.

17. The method of claim 1, wherein cutting the pulled preform into portions comprises cutting the pulled preform into portions having substantially equal lengths.

18. The method of claim 1, wherein pulling the tube preform is carried out using a drawing tower system.

* * * * *